April 4, 1939.  J. F. DONOVAN ET AL  2,152,793
SEALING-IN MACHINE
Filed July 17, 1936
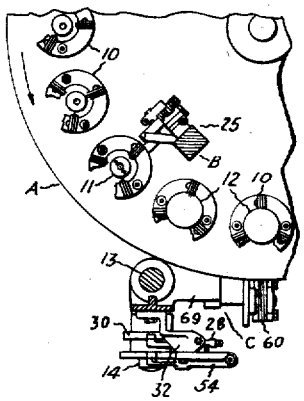
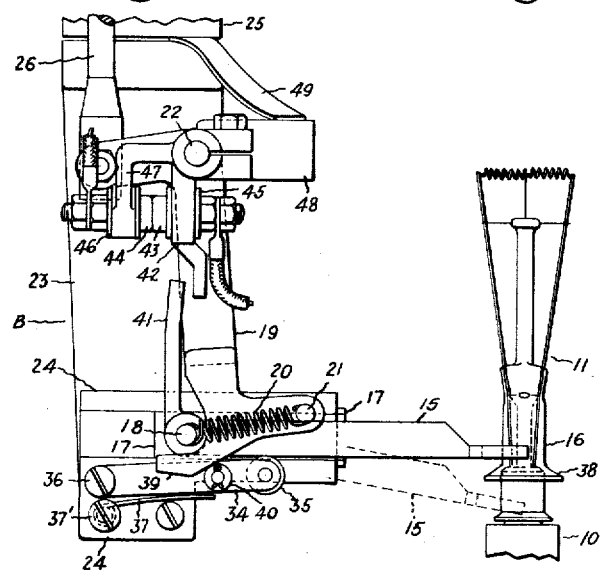
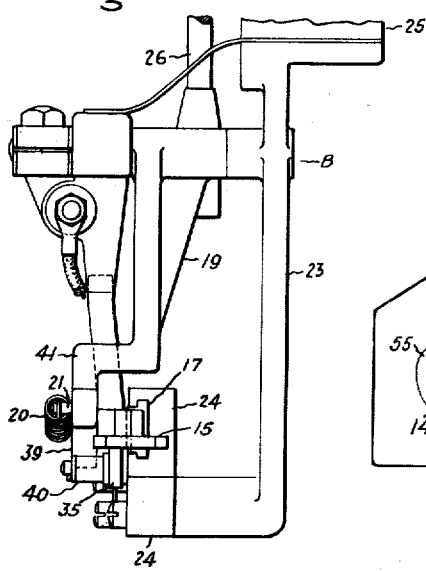
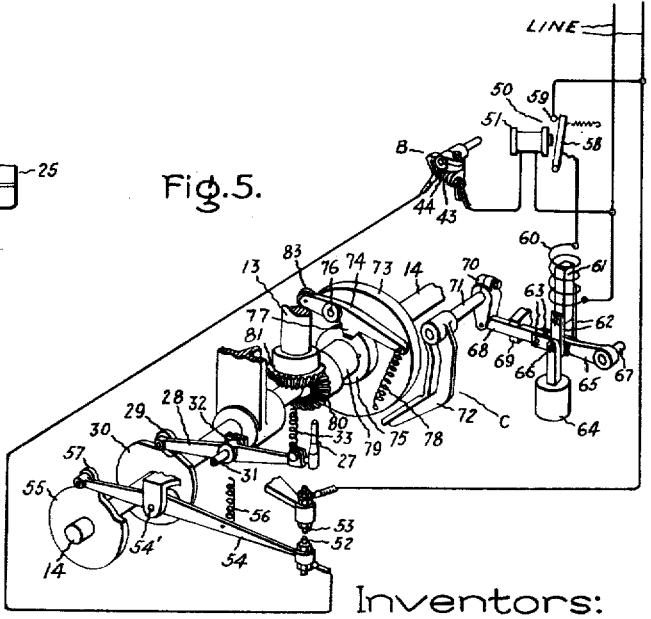
Inventors:
John F. Donovan,
Frank J. Malloy,
by Harry E. Dunham
Their Attorney.

Patented Apr. 4, 1939

2,152,793

UNITED STATES PATENT OFFICE 2,152,793

SEALING-IN MACHINE

John F. Donovan, East Cleveland, and Frank J. Malloy, Cleveland Heights, Ohio, assignors to General Electric Company, a corporation of New York Application July 17, 1936, Serial No. 91,116

7 Claims. (Cl. 49—2)

Our invention relates to the manufacture of electric lamps, radio tubes and the like which are comprised of a stem which supports some of the elements thereof and a bulb which surrounds said elements and is sealed to the stem. Our invention relates more especially to machines for sealing the stems into the bulbs since these machines are provided with heads which carry the stems step by step through the sealing-in operation. Our invention relates to mechanism for detecting whether a given head carries a stem and for discontinuing the operation of a portion of the machine if said stem is absent. According to our invention a movable finger is mounted adjacent the path of travel of the stems which is moved into operative relation thereto and is dropped down onto the outwardly flared portion thereof. The finger closes an electrical circuit if it comes to rest on the flared portion of the stem but fails to close said circuit if the stem is not contacted and it is allowed to fall to a lower position. The electrical circuit is used in this particular instance to stop the feeding of bulbs into the machine but may be used for any other purpose if desired. Our mechanism is constructed so as to prevent injury to the filament or other delicate element carried by the stem and to prevent the stem from being displaced from its proper position in the sealing-in machine. Other features and advantages of our invention will be apparent from the detailed description which follows of one species thereof and from the accompanying drawing.

In the drawing, Fig. 1 is a plan view of a portion of a sealing-in machine and the mechanism of our invention; Fig. 2 is a side elevation of the stem detecting means of our mechanism; Fig. 3 is an end view thereof; Fig. 4 is a plan view of a portion of the feeling finger; and Fig. 5 is a diagrammatic perspective view of the operating and the clutch disconnecting means of our mechanism.

Our mechanism, as shown in Fig. 1, is mounted on a sealing-in machine A with the stem detecting means B thereof located adjacent a station through which each of the sealing-in heads 10 is indexed in the course of its operation. The sealing-in heads 10 are moved in the direction indicated by the arrow and each normally carries a stem 11 into the station adjacent the stem detecting means B. During the interval the sealing-in heads 10 stay at the said station, the stem 11 is felt for and if present is covered by a bulb 12 fed into the sealing-in head 10 by mechanism (not shown). The bulb 12 is fed by mechanism which has been quite generally used for some time and which is driven from shaft 13. Should a stem 11 not be present in the sealing-in head 10, other means C (Figs. 1 and 5) disconnect the shaft 13 from the cam shaft 14 of the sealing-in machine A rendering the bulb feeding mechanism inoperative. Our invention embraces only the means for detecting the stems 11 and means for controlling the operation of other mechanism therefrom and can be used with any indexing machine performing an operation on a stem and with any mechanism operating therewith.

Our mechanism first moves the finger 15 (Figs. 2 and 3) longitudinally to the position shown which places the forked end thereof, shown in Fig. 4, on both sides of the stem tube 16. The movement results from a similar movement of slide 17 on which the finger 15 is mounted through pin 18 and is caused by movement of lever 19 to which it is connected by spring 20. The spring 20 extends between the pin 18 and the pin 21 extending from lever 19. The lever 19 is pivoted on the pin 22 extending from the bracket 23. The bracket 23 supports the block 24 which provides ways for the slide 17 and remains stationary at all times as it is fastened to a portion 25 of the sealing machine A extending over the sealing-in heads 10. The lever 19 is actuated by operating means comprising the rod 26 which is attached to lever 19 and the rod 27 (Fig. 5) which is connected to rod 26 by means (not shown). The rod 27 is actuated by lever 28 which engages through the roller 29 the cam 30 on the shaft 14 of the sealing machine. The shaft 14 provides convenient means for operating the device and other devices since it rotates one revolution between each indexing movement of the heads 10. The lever 28 is pivoted on the pin 31 extending from the stationary bracket 32 and the roller 29 thereon is kept in contact with the cam 30 by the spring 33. The spring 33 extends between the lever 28 and a stationary part of the machine.

The weight of the forked end of the finger 15 would tend to turn it about pin 18 if it were not supported by the arm 34 which engages said finger 15 through roller 35. The arm 34 is pivotally mounted on the screw 36 extending from block 24 and is held up in position by the spring 37 extending from screw 37' in said block 24. With the finger 15 in the outer position, the arm 34 is lowered so that the finger 15 drops on the flange 38 of the stem tube 16 if a stem is present on the head 10, or falls to a much lower position, as indicated in dotted lines in Fig. 2, if a stem is not present. The arm 34 is moved down by the cam surface 39 of lever 19 which is brought into position above the roller 40 on the arm 34. Should the finger 15 strike the flange 38 of the stem tube 16, no further action takes place, but if the finger 15 falls into the lower position, the end 41 thereof strikes arm 42. The arm 42 is pivoted on post 22 and is moved by the end 41 of finger 15 so that the contact 43 is moved away from contact 44. Contact 43 is mounted in insulating washers and bushings 45 in arm 42 and contact 44 is mounted in similar insulating washers and bushings 46 in arm 47. The arm 47 is a fixed member, being clamped to the post 22. If a stem is present on the head 10, the contacts 43 and 44 are held in contact with each other by the weighted portion 48 of arm 42 and spring 49 which tend to turn the said arm 42 clockwise. The spring 49 is clamped between bracket 23 and the supporting structure 25 of the sealing machine and is of such shape as to press on the weight.

The contacts 43 and 44 are in the controlling circuit of a clutch through which other mechanism (bulb loader) is driven. The controlling circuit consists of the relay 50, the solenoid 51 of which is connected in the lead from contact 43 to one side of the line, and of the contacts 52 and 53, the former 52 of which is connected to contact 44 and the latter of which is connected to the other side of said line. Since contacts 52 and 53 are included in the circuit, the relay 50 is not actuated except when both pairs of contacts are touching. Contact 53 is mounted on and insulated from the arm of stationary bracket 32 which is only partially shown, whereas contact 52 is mounted on lever 54 and is insulated therefrom. A cam 55 on shaft 14 turns lever 54 about pin 54′ so as to bring the contacts together at intervals when the finger 15 is either resting against the stem flange 38 or is in the lower position. In this way the relay 50 is actuated when a stem 11 is in position on the head 10. Lever 54 is turned by spring 56 so that roller 57 is kept against cam 55.

Actuating the relay 50 brings armature 58 into engagement with contact 59 which completes the circuit from one side of the line through contact 59, armature 58 and solenoid coil 60 to the other side of the line. Current then flows through coil 60 and the magnetic flux generated thereby lifts the armature 61 actuating the clutch-controlling means C. The clutch-controlling means C comprises the pairs of links 62 and 63, the weight 64 and the arm 65 which are connected together by pin 66. As the armature 61 is raised, the arm 65 is turned about the stationary pin 67 and the pair of links 63 moves the rod 68 longitudinally. The rod 68 is slidably mounted in bracket 69 (only partially shown) and is connected through arm 70 and rod 71 to the shoe 72. With the armature 61 in the raised position, the shoe 72 is out away from the clutch which comprises the disc 73, the lever 74 and the notched drum 75 and the clutch remains engaged. The drive is then from shaft 14 to the disc 73 mounted thereon and from the disc 73 through pin 76 to the lever 74 which engages drum 75. The lever 74 is provided with a tooth 77 which fits into a notch in drum 75 and is held in this position by the spring 78 which is located between the posts extending from disc 73 and said lever 74. The drum 75 rides on one end of sleeve 79 which is slidably mounted on the shaft 14 and drives the bevel gear 80 which is mounted on the other end of said sleeve 79 and which drives bevel gear 81 and shaft 13. The shaft 13 provides the driving means for the mechanism (the bulb feeder) controlled by our device. When a stem is not present on the sealing head 10, the clutch-controlling means remains in the position shown and the roller 83 on lever 74 strikes the shoe 72 as the shaft 14 is turned. By striking the shoe 72, the roller 83 turns the lever 74 about pin 76 lifting the tooth 77 of said lever 74 out of the notch and disengaging the clutch.

What we claim as new and desire to secure by Letters Patent of the United States is:

1. In a device of the class described, the combination of a turret constructed and arranged to be indexed and having a plurality of heads thereon for supporting stems, stem detecting means comprising a finger disposed adjacent to the path of travel of said heads, means for moving said finger into engagement with a stem in one of said heads or, in the absence of a stem through the position normally occupied thereby, actuating mechanism for causing further operations to be performed with respect to the stems in said heads, and means actuated by said finger upon failure thereof to engage a stem in one of said heads for interrupting the operation of said actuating mechanism.

2. In a device of the class described, the combination of a turret constructed and arranged to be indexed and having a plurality of heads thereon for supporting stems, stem detecting means comprising a finger disposed adjacent to the path of travel of said heads, means for moving said finger into a position adjacent to a stem in one of said heads, means for lowering said finger into engagement with a portion of said stem or, in the absence of a stem, through the position normally occupied thereby, actuating mechanism for causing further operations to be performed with respect to the stems in said heads, and means actuated by said finger upon failure thereof to engage a stem in one of said heads for interrupting the operation of said actuating mechanism.

3. In a device of the class described, the combination of a turret constructed and arranged to be indexed and having a plurality of heads thereon for supporting stems, stem detecting means comprising a slide disposed adjacent to the path of travel of said heads, a finger pivotally mounted on said slide, supporting means for holding said finger in a substantially horizontal position, means for advancing said slide to move said finger into a position adjacent to a stem in one of said heads, means for lowering said supporting means to cause the said finger to drop into engagement with said stem or, in the absence of a stem, through the position normally occupied thereby, actuating mechanism for causing further operations to be performed with respect to the stems in said heads, and means actuated by said finger upon failure thereof to engage a stem in one of said heads for interrupting the operation of said actuating mechanism.

4. In a device of the class described, the combination of a turret constructed and arranged to be indexed and having a plurality of heads thereon for supporting stems, stem detecting means comprising a finger disposed adjacent to the path of travel of said heads, means for moving said finger into engagement with a stem in one of said heads or, in the absence of a stem, through the position normally occupied thereby, a pair of contacts mounted adjacent to said finger and normally in engagement with each other, said contacts being separated by said finger upon movement thereof through the position normally occupied by a stem, an electrical circuit including said contacts, means including a clutch for causing further operations to be performed with respect to the stems in said heads and means connected in said electrical circuit for causing said clutch to be disconnected upon separation of the said contacts.

5. In a device of the class described, the combination of a turret constructed and arranged to be indexed and having a plurality of heads thereon for supporting stems, stem detecting means comprising a slide disposed adjacent to the path of travel of said heads, a finger pivotally mounted on said slide, supporting means for holding said finger in a substantially horizontal position, means for advancing said slide to move said finger into a position adjacent to a stem in one of said heads, means for lowering said supporting means to cause the said finger to drop into engagement with a portion of said stem or, in the absence of a stem, through the position normally occupied thereby, a pair of contacts mounted adjacent to said finger and normally in engagement with each other, said contacts being separated by said finger upon movement thereof through the position normally occupied by a stem, an electrical circuit including said contacts, means including a clutch for causing further operations to be performed with respect to the stems in said heads and means connected in said electrical circuit for causing said clutch to be disconnected upon separation of the said contacts.

6. In a device of the class described, the combination of a turret constructed and arranged to be indexed and having a plurality of heads thereon for supporting stems and bulbs, actuating mechanism for causing bulbs to be fed to said heads at an indexing station, means for detecting the presence or absence of a stem in each of said heads before it reaches said bulb feeding station, and means actuated by said detecting means for rendering said bulb feed actuating mechanism inoperative upon absence of a stem in one of said heads.

7. In a device of the class described, the combination of a turret constructed and arranged to be indexed and having a plurality of heads thereon for supporting stems and bulbs, actuating mechanism for causing bulbs to be fed to said heads at an indexing station, means for detecting the presence or absence of a stem in each of said heads before it reaches said bulb feeding station comprising a finger disposed adjacent to the path of travel of said heads, means for moving said finger into engagement with a stem in one of said heads or, in the absence of a stem through the position normally occupied thereby, and means actuated by said detecting means for rendering said bulb feed actuating mechanism inoperative upon absence of a stem in one of said heads.

JOHN F. DONOVAN.
FRANK J. MALLOY.

CERTIFICATE OF CORRECTION.

Patent No. 2,152,793.     April 4, 1939.

JOHN F. DONOVAN, ET AL.

It is hereby certified that error appears in the printed specification of the above numbered patent requiring correction as follows: Page 2, first column, line 2, for "posittion" read position; and second column, line 55, claim 3, after "with" insert the words a portion of; and that the said Letters Patent should be read with this correction therein that the same may conform to the record of the case in the Patent Office.

Signed and sealed this 6th day of June, A.D. 1939.

Henry Van Arsdale
Acting Commissioner of Patents.

(Seal)

occupied by a stem, an electrical circuit including said contacts, means including a clutch for causing further operations to be performed with respect to the stems in said heads and means connected in said electrical circuit for causing said clutch to be disconnected upon separation of the said contacts.

5. In a device of the class described, the combination of a turret constructed and arranged to be indexed and having a plurality of heads thereon for supporting stems, stem detecting means comprising a slide disposed adjacent to the path of travel of said heads, a finger pivotally mounted on said slide, supporting means for holding said finger in a substantially horizontal position, means for advancing said slide to move said finger into a position adjacent to a stem in one of said heads, means for lowering said supporting means to cause the said finger to drop into engagement with a portion of said stem or, in the absence of a stem, through the position normally occupied thereby, a pair of contacts mounted adjacent to said finger and normally in engagement with each other, said contacts being separated by said finger upon movement thereof through the position normally occupied by a stem, an electrical circuit including said contacts, means including a clutch for causing further operations to be performed with respect to the stems in said heads and means connected in said electrical circuit for causing said clutch to be disconnected upon separation of the said contacts.

6. In a device of the class described, the combination of a turret constructed and arranged to be indexed and having a plurality of heads thereon for supporting stems and bulbs, actuating mechanism for causing bulbs to be fed to said heads at an indexing station, means for detecting the presence or absence of a stem in each of said heads before it reaches said bulb feeding station, and means actuated by said detecting means for rendering said bulb feed actuating mechanism inoperative upon absence of a stem in one of said heads.

7. In a device of the class described, the combination of a turret constructed and arranged to be indexed and having a plurality of heads thereon for supporting stems and bulbs, actuating mechanism for causing bulbs to be fed to said heads at an indexing station, means for detecting the presence or absence of a stem in each of said heads before it reaches said bulb feeding station comprising a finger disposed adjacent to the path of travel of said heads, means for moving said finger into engagement with a stem in one of said heads or, in the absence of a stem through the position normally occupied thereby, and means actuated by said detecting means for rendering said bulb feed actuating mechanism inoperative upon absence of a stem in one of said heads.

JOHN F. DONOVAN.
FRANK J. MALLOY.

CERTIFICATE OF CORRECTION.

Patent No. 2,152,793.  April 4, 1939.

JOHN F. DONOVAN, ET AL.

It is hereby certified that error appears in the printed specification of the above numbered patent requiring correction as follows: Page 2, first column, line 2, for "posittion" read position; and second column, line 55, claim 3, after "with" insert the words a portion of; and that the said Letters Patent should be read with this correction therein that the same may conform to the record of the case in the Patent Office.

Signed and sealed this 6th day of June, A.D. 1939.

Henry Van Arsdale
Acting Commissioner of Patents.

(Seal)